UNITED STATES PATENT OFFICE.

WILLIAM MOSHIER, OF NORWALK, OHIO, ASSIGNOR OF ONE-THIRD HIS RIGHT TO CHARLES T. MERRY, OF SAME PLACE.

IMPROVEMENT IN RUBBER CEMENTS.

Specification forming part of Letters Patent No. 138,917, dated May 13, 1873; application filed February 15, 1873.

*To all whom it may concern:*

Be it known that I, WILLIAM MOSHIER, of Norwalk, in the county of Huron and State of Ohio, have invented a new and valuable Improvement in India-Rubber Cement; and I do hereby declare that the following is a full, clear, and exact description of the same.

My invention relates to an improved cement for India rubber, intended more particularly for cementing new rubber to old, for the purpose of repairing articles made of rubber, such as boots and shoes, water-proof clothing, &c.; and it consists in compounding together the following ingredients:

One-quarter pound pure virgin rubber, in its original state; one-half gallon benzine or naphtha; two ounces isinglass; two ounces chloroform.

To prepare the compound, put the benzine to the rubber, and when thoroughly cut add the isinglass and chloroform. The ingredients are mixed together, and thoroughly incorporated with each other, forming a cement, which is applied to the rubber in a liquid state, and when dry holds the cemented parts securely together.

What I claim as my invention, and desire to secure by Letters Patent, is—

The rubber cement described, compounded of the ingredients in the proportion substantially as specified.

In testimony that I claim the above I have hereunto subscribed my name in the presence of two witnesses.

WILLIAM MOSHIER.

Witnesses:
ETHAN A. PRAY,
HENRY H. MANAKAN.